United States Patent [19]

Lembke et al.

[11] Patent Number: 5,275,143

[45] Date of Patent: Jan. 4, 1994

[54] METHOD FOR REDUCING THE FUEL SUPPLY FOR ONE ENGINE CYLINDER

[75] Inventors: Manfred Lembke, Gerlingen; Alfred Kratt, Schwieberdingen; Anwar Abidin, Leonberg, all of Fed. Rep. of Germany

[73] Assignee: Robert Bosch GmbH, Stuttgart, Fed. Rep. of Germany

[21] Appl. No.: 768,982

[22] Filed: Dec. 9, 1991

Related U.S. Application Data

[63] Continuation of PCT/DE90/00228, Mar. 22, 1990.

[30] Foreign Application Priority Data

Apr. 8, 1989 [DE] Fed. Rep. of Germany ....... 3911508

[51] Int. Cl.$^5$ ............................................. F02D 41/34
[52] U.S. Cl. .................................. 123/479; 123/481
[58] Field of Search ................ 123/479, 481, 520

[56] References Cited

U.S. PATENT DOCUMENTS 4,485,791 12/1984 Sugo et al. .......................... 123/478
4,532,905 8/1985 Yokooku et al. .................... 123/443
4,928,228 5/1990 Fujimoto et al. .................... 123/479

FOREIGN PATENT DOCUMENTS 3817920 12/1988 Fed. Rep. of Germany .
3724420  2/1989 Fed. Rep. of Germany .
59-170434 9/1984 Japan ................................ 123/481

Primary Examiner—Andrew M. Dolinar
Attorney, Agent, or Firm—Kenyon & Kenyon

[57] ABSTRACT

In a method for reducing the fuel supply for one cylinder of a multi-cylinder internal combustion engine with centralized injection, the procedure is that the cylinder located in the intake cycle sequence in front of the cylinder whose mixture is to be made much leaner, for example because of unreliable combustion, is already supplied with less fuel than is the case when all cylinders are operable. In addition, the intake cycle for the failed cylinder itself is supplied with as little fuel as possible. Using this method, it is possible to set a very lean mixture in the failed cylinder but a mixture having a lambda value close to 1 in the remaining cylinders. This ensures that the motor vehicle in which the internal combustion engine with the failed cylinder is operating can still be reliably operated and, at the same time, there is no risk of overheating of the catalytic converter.

12 Claims, 2 Drawing Sheets

METHOD FOR REDUCING THE FUEL SUPPLY FOR ONE ENGINE CYLINDER

This is continuation of PCT application Ser. No. PCT/DE90/00228 filed Mar. 22, 1990.

FIELD OF THE INVENTION

The invention relates to a method for reducing the fuel supply for a selected cylinder of a multi-cylinder internal combustion engine. The selected cylinder is one in which a state has occurred which prevents reliable combustion of an air/fuel mixture. It will thus be, for example, a cylinder in which the ignition has failed.

BACKGROUND OF THE INVENTION

It is known of internal combustion engines with single injection to suppress the fuel supply to one cylinder by switching off the injection valve as soon as it is found that this cylinder has failed, that is to say, a state has occurred in which reliable combustion is no longer possible. The remaining cylinders are still operated in unchanged manner, that is to say, as if all cylinders were still satisfactorily operating.

In internal combustion engines with single injection, it is obviously possible in a very simple manner to reduce the fuel supply to a selected cylinder down to the amount of zero. For internal combustion engines with centralized injection, in contrast, hitherto only methods have been known which permit a reduction of the fuel supply for a selected cylinder only in a small ratio with respect to the fuel quantity supplied to the other cylinders. A method for reducing the fuel supply for a selected cylinder of a multi-cylinder internal combustion engine with centralized injection is known from DE 2,929,516 C2. The beginning and length of operation of the fuel injection valve can be individually determined for each individual cylinder. The values are selected in such a manner that optimum operation of the internal combustion engine is achieved. Using the known method, it is not possible to reduce the fuel quantity for a single cylinder in this manner to such a low value as is required when the cylinder has failed. Accordingly, there is not even an investigation as to whether a cylinder has failed in the known method.

The great reduction of fuel supplied to a failed cylinder is required since, in the motor vehicles with catalytic converter, which have been produced in large volumes for some time, it is dangerous to send unburnt fuel into the catalytic converter. This is because fuel is subjected there to post-combustion, which can lead to overheating of the catalytic converter when the fuel quantity is too large, and thus to the hazard of a fire for the entire vehicle.

For some time, there has therefore been a need to find a method enabling a failed cylinder to be supplied with only extremely little fuel, for internal combustion engines with centralized injection, the internal combustion engine, however, still remaining operable so that the vehicle with the defective internal combustion engine does not remain stopped. In vehicles with catalytic converters, the internal combustion engine previously had to be switched off when a cylinder failed in order to prevent, by this switching-off, an overheating of the catalytic converter.

SUMMARY OF THE INVENTION

The method according to the present invention proceeds in such a manner that the cylinder located in front of the failed cylinder in the intake cycle sequence is already supplied with less fuel than is the case when all cylinders are operable. In this method, the failure of a cylinder is detected in accordance with any conventional technique. This method makes it possible, even with centralized injection, to reduce the fuel supply to the failed cylinder by such an amount that no overheating of the catalytic converter can occur due to initially unburnt fuel.

Good test results have hitherto been achieved in a four-cylinder engine by effecting only two instead of four injections during four intake cycles. It appears to be generally advantageous to allow not only the injection for the intake cycle of the failed cylinder but also for the cylinder in front of it in the intake cycle to fail. So that the cylinder before is, nevertheless, sufficiently supplied with fuel, it is then advantageous to displace the remaining injection periods to later in time, to be precise, closer to the front of the intake cycle for the failed cylinder.

DETAILED DESCRIPTION OF THE DRAWINGS

Figure 1:
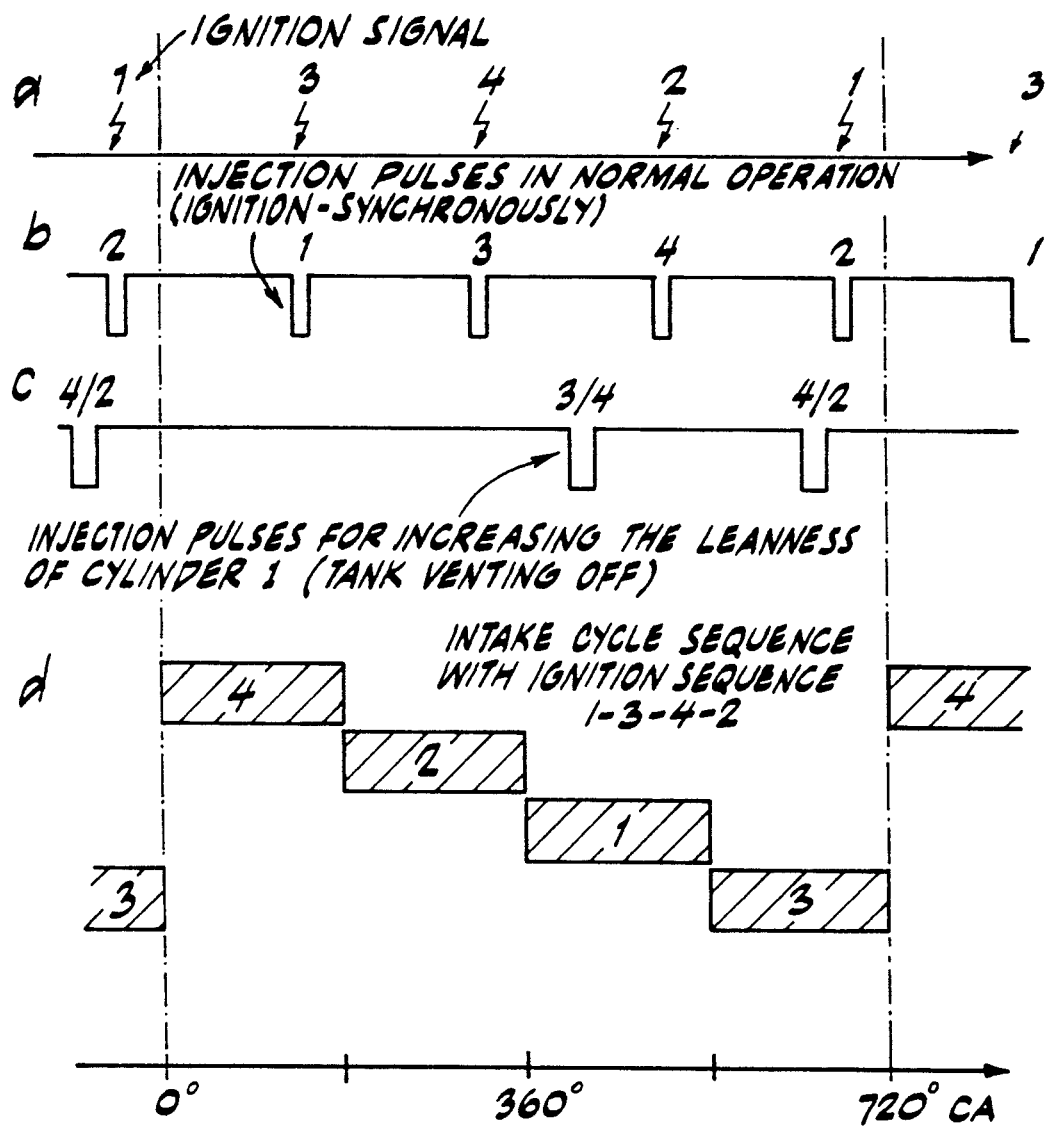
FIGS. 1a–d show time-synchronized diagrams for explaining the sequence of ignition signals (a), the injection pulses in normal operation (b), the injection pulses for rendering the first cylinder of a four-cylinder four-cycle engine (c) or the intake cycle sequence (d) leaner.

In FIG. 1, a sequence of ignition signals for a four-cylinder four-cycle engine is shown. An ignition pulse occurs every 180° crank angle. The order is 1, 3, 4, 2 with the ignition pulse for cylinder 1 at about −40° crank angle, that is to say about 40° before top dead center. In most internal combustion engines with centralized injection, the injection pulses are emitted ignition-synchronously, that is to say synchronously with the ignition signal. The duration of each injection depends, in particular, on load and rotational speed.

FIG. 1d shows the intake cycles for the internal combustion engine. As can be seen, the intake cycle for cylinder 1 begins at 360° crank angle. This intake cycle is associated with the above-mentioned injection pulse which is located at 140° crank angle. The offset is due to the dead time of the system and is dependent on load and rotational speed. With each intake cycle, therefore, the fuel quantity taken in is essentially that which has been injected in advance by the offset, lifting away only, occurring here following the beginning of the injection pulse.

Let it be assumed now that cylinder 1 has failed and should therefore receive as little fuel as possible. In this case, it will be thought to allow the injection pulse for the intake cycle of cylinder 1 to fail; this is the injection pulse marked by no. 1 in FIG. 1b However, it has been found that this measure is inadequate. This will be illustrated with reference to FIG. 2 in the text which follows.

Figure 2:
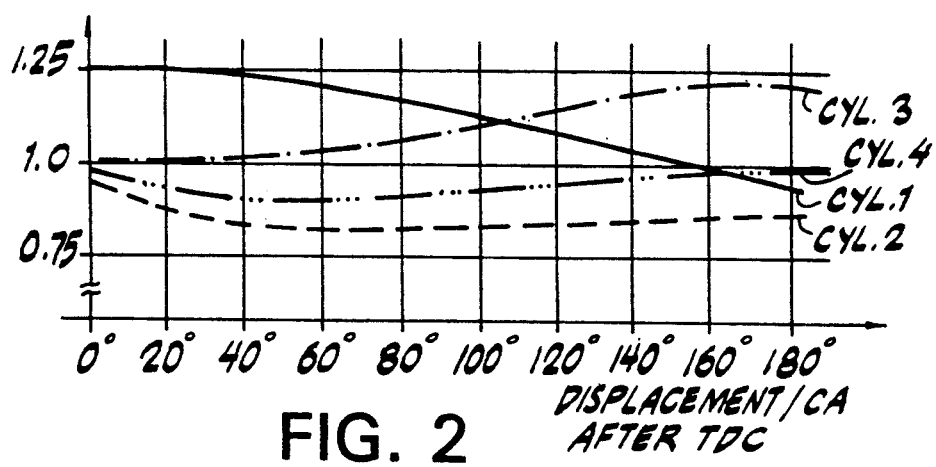
FIG. 2 shows a diagram for explaining the lambda value obtained for individual cylinders in dependence on the displacement of the three injection pulses with respect to the crank angle.

FIG. 2 shows lambda values for a case in which the injection pulse designated by "1" in FIG. 1b has been omitted. It is also shown how the distribution of the mixture to the individual cylinders changes when the remaining injection pulses are displaced towards later in time by an increasingly larger crank angle. As can be seen, a relatively lean value can be set for the cylinder 1 without displacing the injection pulses. The lambda values for the other cylinders are then close to a lambda value of one, or in the rich area. However, only a lambda value of about 1.25 can be achieved for the cylinder, which means there is still too much fuel present for an overheating of the catalytic converter to be reliably prevented.

The mixture in cylinder 1 becomes richer with increasing displacement of the injection pulses towards later in time. As can be expected, the mixture for cylinder 3 is leanest after a displacement by approximately 180° crank angle.

Figure 3:
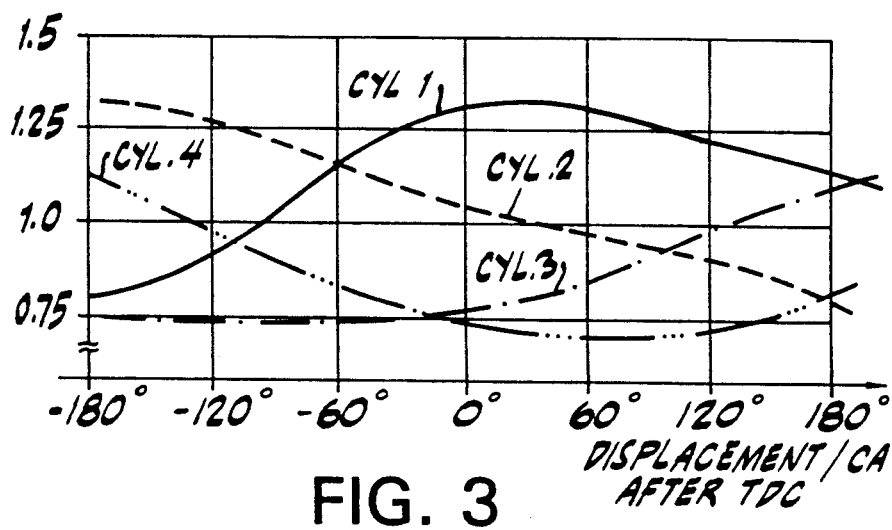
FIG. 3 shows a diagram according to that of FIG. 2, but for a method with two injection pulses.

If, then, it is not only the injection pulse numbered "1" according to FIG. 1b which is omitted but also that numbered "2", and if the other injection pulses are shifted to and from by angles drawn along the abscissa in FIG. 3 compared with their usual position for normal operation, the curves drawn in FIG. 3 are obtained for the lambda values in the four-cylinders. It can be seen that with a slight displacement towards later in time for cylinder 1, a lambda value of about 1.4 can be achieved, and that at the same time the lambda value for cylinder 2 is also in the lean area, but the lambda values for the remaining two cylinders are in the rich area.

Figure 4:
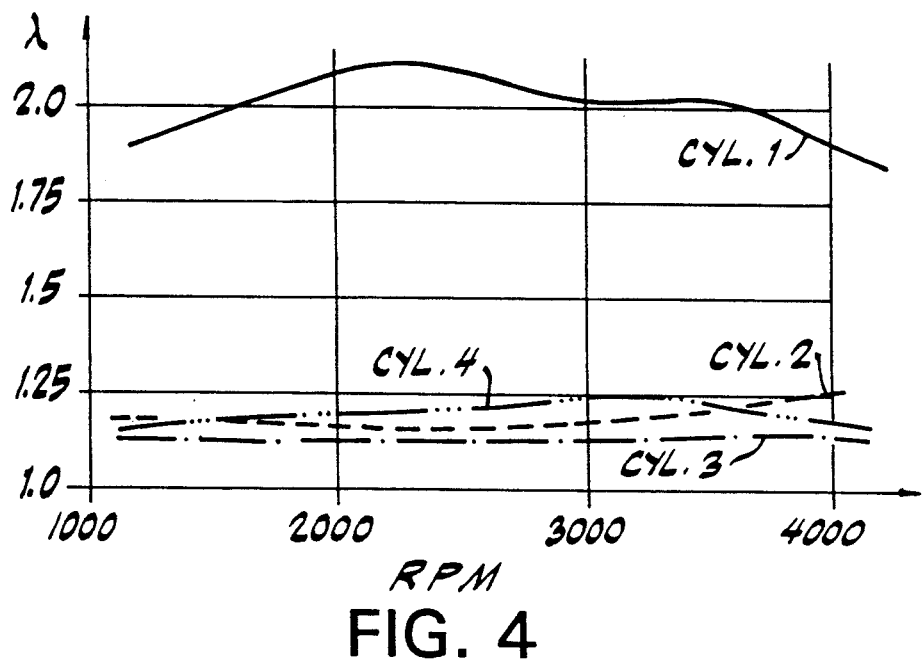
FIG. 4 shows a diagram concerning the lambda values for various cylinders in dependence on the rotational speed, when carrying out the method according to FIGS. 1c and d.

A much higher degree of leanness of the mixture in cylinder 1 is achieved with a position of the injection pulses as drawn in FIG. 1c. According to FIG. 1c, there are in each case only two, instead of four, injection pulses, and these are displaced differently in their position. The injection pulse designated by "3" in FIG. 1b is displaced from +320° crank angle to +400° crank angle, that is to say by 80° in the direction of later in time, while the pulse designated by "4" in FIG. 1b is displaced from about 500° crank angle to +660° crank angle, that is to say by 160°. These two pulses can no longer be associated with cylinders 3 and 4, but the pulse at 400° crank angle mainly supplies fuel for the cylinders 3 and 4 while that at 660° crank angle mainly supplies fuel for the cylinders 4 and 2. These two pulses contain 75% of the fuel quantity which is injected with four pulses in normal operation. FIG. 4 represents the associated lambda curve against rotational speed, but the displacement of the injection pulses of 80° crank angle and 160° crank angle according to FIG. 1c only applies to a speed of 2000 rpm. At lower rotational speeds, a lesser displacement, and with higher rotational speeds, a greater displacement, of the two injection pulses was selected.

With this position of the injection pulses and the quantity injected with this arrangement, the resultant variation of the lambda value against rotational speed means a very lean mixture for cylinder 1 over all rotational speeds while the lambda values for the three remaining cylinders are slightly lean. The internal combustion engine can still be operated well with these values and, at the same time, an overheating of the catalytic converter due to unburnt fuel from cylinder 1 can be prevented. The lambda value for cylinder 1 fluctuates around 2, that is to say indicates very lean values.

It has been found that even leaner values can be achieved for the mixture in cylinder 1 and even more uniform lambda values for the remaining cylinders when different fuel quantities are selected for the two injection pulses or when short intermediate sprays are injected. The overall optimum measures depend on the respective internal combustion engine present. However, it is of importance in all cases that the cylinder located in front of the failed cylinder in the intake cycle sequence is already supplied with less fuel than is the case when all cylinders are operable.

The illustrative embodiment described for a fourcylinder four-cycle engine can be correspondingly transferred to internal combustion engines having a different number of cylinders. Here, too, the cylinder in front of the failed cylinder in the intake cycle sequence is to receive less fuel than in the normal case. In all cases, it appears to be advantageous to allow not only the injection for the intake cycle of the failed cylinder to fail but also that for the intake cycle in front of it. In a six-cylinder engine, for example, only four injection pulses are now sent out over 720° crank angle. So that the failure of the two injection pulses does not result in too great a gap in time in the fuel supply, it is advantageous to displace the still-remaining injection pulses towards later in time, to be precise, closer to the front of the beginning of the intake cycle for the failed cylinder. The total quantity of the fuel injected via the remaining injection pulses expediently corresponds to approximately the quantity which is obtained in normal operation when the fuel quantity for a single cylinder with a properly operating internal combustion engine is subtracted from the total quantity for all cylinders with proper operation. In a six-cylinder engine, about 84% of the quantity which would otherwise be injected in six pulses will thus be injected in four pulses.

Instead of allowing two injection pulses to fail completely and to displace the other ones in position, only one injection pulse can be allowed to fail completely and another one supplied with only a part-quantity. The remaining ones are then displaced less in their position than is the case when two pulses are allowed to fail completely. A displacement of the remaining pulses appears basically advisable but, in the case of special engine types, it is also possible to allow only injection pulses to fail, to adapt the quantity in the remaining pulses but to retain the positions of normal operation.

Thus, the number of injection pulses, the quantity of fuel in each pulse and the position of the pulses can be varied. However, it is always of importance that the cylinder located in front of the failed cylinder in the intake cycle sequence is already supplied with less fuel than is the case when all cylinders are operable. It will be attempted to operate the other cylinders with a lambda value of about 1.

Obviously, the quantity of fuel to be injected in each injection pulse depends on rotational speed and load. However, it has been found that the positions of the injection pulses are expediently made dependent on rotational speed and load or other engine parameters in order to achieve optimum results with respect to the leanest possible mixture for the failed cylinder and mixtures close to the lambda value of 1 for the remaining cylinders. Furthermore, the ignition times can be varied in order to achieve reliable ignition of the cylinders which have not failed, even with lean mixtures.

If the method according to the present invention is used in a vehicle with tank venting, it is advantageous to switch the tank venting off completely with the failure of a cylinder so that fuel does not pass from there into the failed cylinder which could then lead to overheating of the catalytic converter.

What is claimed is:

1. A method for reducing a fuel supply to a multi-cylinder internal combustion engine having a common injection system for all cylinders, comprising the steps of:
    determining whether a first condition occurs in a first cylinder which prevents reliable combustion of an air/fuel mixture in the first cylinder; and
    reducing a first supply of fuel to the first cylinder, upon the occurrence of the first condition, with a reduced supply of fuel being fed to a second cylinder which precedes the first cylinder in an intake cycle sequence.

2. The method according to claim 1, wherein the method further comprising the step of performing at least one injection fewer for every two crankshaft revolutions than there are intake cycles, a fuel quantity distributed between remaining injections being approximately equal to a fuel quantity for a single cylinder when the internal combustion engine is properly operating is subtracted from a total fuel quantity for all cylinders when the internal combustion engine is operating correctly.

3. The method according to claim 2, further comprising the step of omitting a fuel injection for the intake cycle of the first cylinder, with the second supply of fuel to the second cylinder being reduced below a fuel quantity which would be injected in the case of operable cylinders.

4. The method according to claim 3, wherein the second supply of fuel to the second cylinder is reduced to the value zero.

5. The method according to claim 4, wherein injection periods for intake cycles preceding an intake cycle for the first cylinder are displaced closer to the beginning of the intake cycle for the first cylinder.

6. The method according to claim 5, wherein the displacement of the injection periods is changed dependent upon a load on and a rotational speed of the engine.

7. A method of operating an internal combustion engine having a plurality of cylinders and central fuel injection, comprising the steps of:
    (a) determining whether a first cylinder is operable; and
    (a) supplying a first amount of fuel to the first cylinder if the first cylinder is operable; and
    (a) supplying a second amount of fuel to the first cylinder and a third amount of fuel to a second cylinder preceding the first cylinder in an intake stroke sequence, both the second and third amounts of fuel being less than the first amount of fuel if the first cylinder is inoperable.

8. The method according to claim 7, wherein the second amount of fuel is approximately zero.

9. The method according to claim 7, wherein the third amount of fuel is approximately zero.

10. The method according to claim 7, wherein injection periods for intake cycles preceding an intake cycle for the first cylinder are delayed so that the injection periods are closer to the beginning of the intake cycle for the first cylinder.

11. The method according to claim 10, wherein the delay of the injection periods depends upon a load on the engine and a rotational speed of the engine.

12. A method for reducing a fuel supply to a multi-cylinder internal combustion engine having a common injection system for all cylinders and also having tank venting, comprising the steps of:
    determining whether a first condition occurs in a first cylinder which prevents reliable combustion of an air/fuel mixture in the first cylinder; and
    preventing tank venting and reducing a first supply of fuel to the first cylinder, upon the occurrence of the first condition, with a reduced supply of fuel being fed to a second cylinder which precedes the first cylinder in an intake cycle sequence.

* * * * *